United States Patent [19]

Weaver

[11] 4,127,037

[45] Nov. 28, 1978

[54] ADJUSTING MECHANISM

[75] Inventor: Preston R. Weaver, Rocky Hill, Conn.

[73] Assignee: UMC Electronics Company, North Haven, Conn.

[21] Appl. No.: 739,626

[22] Filed: Nov. 8, 1976

[51] Int. Cl.[2] .............................................. F16H 27/02

[52] U.S. Cl. .................................. 74/89.15; 85/50 C

[58] Field of Search ............... 85/50 C, 9 R; 248/509; 74/89.15, 424.8 R

[56] References Cited

U.S. PATENT DOCUMENTS

| | | | |
|---|---|---|---|
| 1,077,410 | 11/1913 | Kling | 85/50 C |
| 2,442,833 | 6/1948 | Watkins | 248/509 |

FOREIGN PATENT DOCUMENTS

| | | | |
|---|---|---|---|
| 1,556,381 | 12/1968 | France | 85/50 C |

*Primary Examiner*—Allan D. Herrmann
*Assistant Examiner*—Wesley S. Ratliff, Jr.
*Attorney, Agent, or Firm*—DeLio and Montgomery

[57] ABSTRACT

A mechanism for adjusting a member in three degrees with respect to a reference plane comprising three screws with spherical underheads extending through the member and threadably received in a base plate, springs about the shanks of the screws bias the member upwardly while the spherical underheads make at least full fine circular contact in recesses from the upper surface of the member.

4 Claims, 5 Drawing Figures

ADJUSTING MECHANISM

This invention relates to adjusting mechanisms, and more particularly relates to a mechanism for adjusting a member in three degrees with respect to a reference plane.

The invention is particularly adaptable for structures in which a member is adjusted in three different degrees and positively held in a final degree of adjustment such as a magnetic playback or record head.

Briefly stated, the invention in one form thereof comprises a member adapted to be supported in a given position above a reference surface and comprises a body member having three openings therein adapted to receive screws therethrough. The upper openings are defined in a dished recess. Three screws extend through the member and into the member defining the reference plane. The member is relieved on the underside and spring-biased upwardly about the screws. A fourth set screw threadably extends through the member and bears on the reference surface. The underside of the screws heads are defined on the surface of a sphere, thus regardless of the angle at which the screw passes through the member there is a full circle of contact between the adjusting screws and the recesses.

An object of this invention is to provide a new and improved means for adjusting the position of a member in three degrees and maintaining such adjustment with respect to a reference plane.

The features of the invention which are believed to be novel are particularly pointed out and distinctly claimed in the concluding portion of the specification. However, the invention both as to its organization and operation, together with further objects and advantages thereof, may best be appreciated by reference to the following detailed description taken in conjunction with the drawing, in which:

An apparatus 10 embodying the invention is arranged to be mounted above a plate or base member 11 having an upper surface 12 which will be considered a reference plane; however, any other plane either physical or defined in space may be considered a reference plane.

Figure 4:
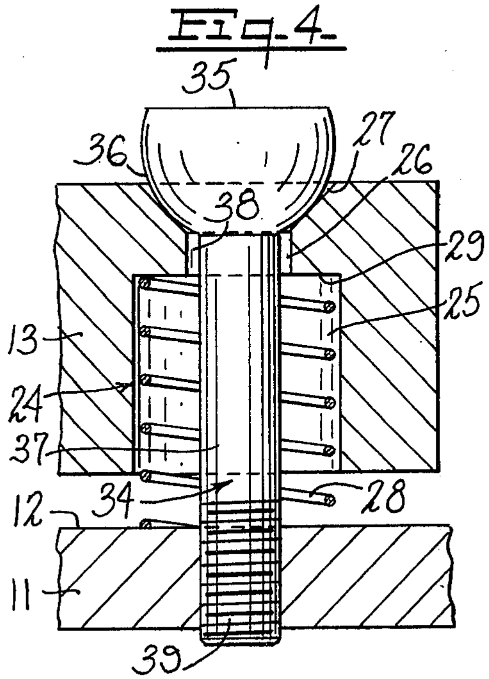
FIG. 4 is a sectional view seen in the plane of lines 4—4 of FIG. 2.

The apparatus comprises a body member 13 which is adapted to mount a support member 14 on a tape playing and recording machine. Shown here the member 14 includes three transducers 15, 16 and 17, commonly referred to as heads mounted in a vertical array along a common center line. Member 14 may be considered a stereo head of the type which is used in broadcast systems where the heads 15 and 16 are adapted to pick up stereo channels and the head 17 senses a cueing channel. Member 14 is held in position in a defined cavity by screws 18 and 19 and a bridging member 20 extending therebetween. Defined in member 13 are three bores 22, 23 and 24. Each of the bores 22, 23 and 24 as shown in FIG. 4 comprises an enlarged cylindrical under portion 25, a necked down portion 26 and an opening formed on a portion of a cone 27. The axes of the bores 22 and 24 are defined perpendicular to a center line C1 which is coincident with center line C of the heads 15, 16 and 17.

Disposed in cylindrical relieve portions 25 are biasing springs 28 acting on undersurfaces 29 bounding bore 25.

The member 13 is thus biased upwardly by the three springs 28 acting between surfaces 29 and 12. The axis of bores 22 and 24 resides on center line C1. Bore 23 is positioned midway between bores 22 and 24. Extending through bores 22, 23 and 24 are screws 32, 33 and 34 having heads 35 with undersurfaces 36 defined on the surface of a sphere. As shown, the undersurfaces are slightly greater than hemispherical excluding the portion joined to the shank 37 and portion 26 of the bore to permit relative movement therebetween. The shaft of the screws are threadably at the lower ends 39 in mating threads in plate 11.

Figure 1:
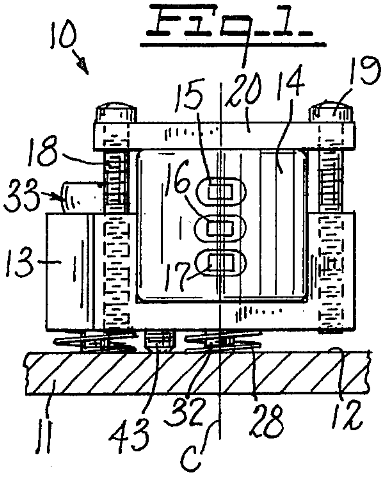
FIG. 1 is a view of an embodiment of the invention in front elevation.
Figure 2:
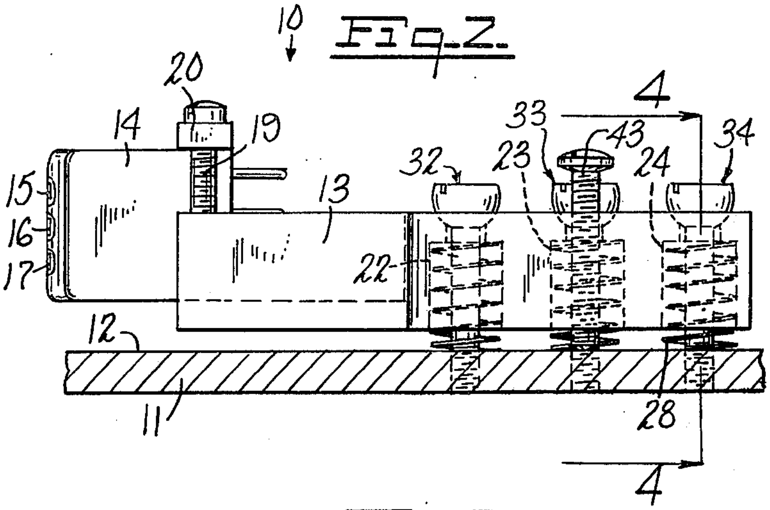
FIG. 2 is a side view of the apparatus of FIG. 1.
Figure 3:
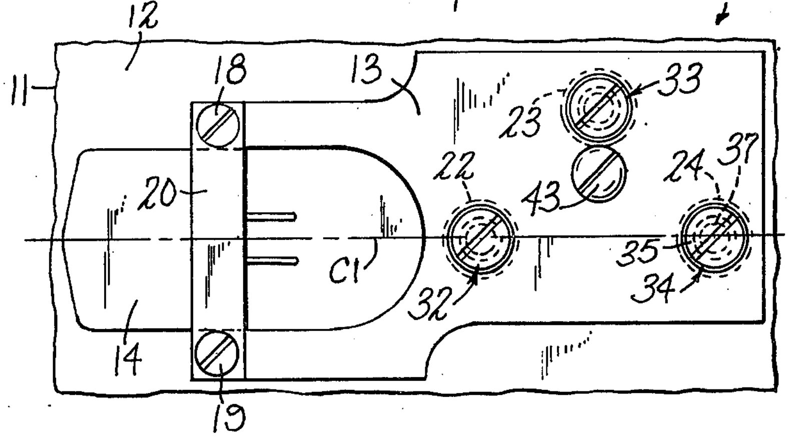
FIG. 3 is a top plan view of the apparatus of FIGS. 1 and 2.

Alternatively, the screws 32, 33 and 34 could be received in captured nuts (not shown) recessed in plate 11. A fourth screw acting as a set screw 43 has its end 44 bearing on plate 11 as more clearly shown in FIG. 1.

With this arrangement, once the position of member 13 has been adjusted with the screws 32, 33 and 34, set screw 43 is threaded down onto surface 12 and will maintain member 13 in the set position.

The provision of the spherical undersurfaces 36 of the adjusting screws 32, 33 and 34 permits full circular line contact of the screws with the conical sockets regardless of the elevation, angle or azimuth of adjustment. This is a distinct advantage and advance over the use of screws having conical underheads where, unless the adjustment is exact and plane and plumb in all directions, there is only point contact between the screws and the sockets.

The member is adjusted in elevation by all three of screws 32, 33 and 34. It is adjusted about horizontal center line C1 only by screw 33, or possibly screws 32 and 34. Once adjusted, set screw 43 is set down on surface 12 and the position of adjustment is thereafter positive in three areas of full line circle contact between the screws 32, 33 and 34 and the member 13.

Figure 5:
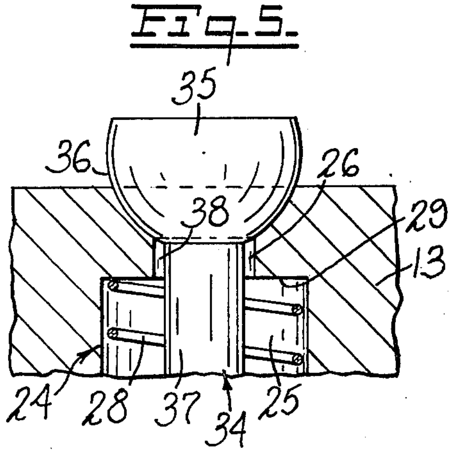
FIG. 5 is a partial view similar to FIG. 4 but showing an alternate embodiment of the invention.

An alternate arrangement is shown in FIG. 5 wherein the entrance of the bore is also defined on the surface of a sphere.

In practice, it has been found that the degrees of adjustment desired in the application shown can be achieved when the bore portion 26 is 10 to 25 percent larger than the diameter of the shank of the adjusting screws and the height of bore portion 26 is about one-half the diameter of the shank.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the apppended claims are intended to cover all embodiments of the invention and modifications to the disclosed embodiments which do not depart from the spirit and scope of the invention.

What is claimed is:

1. Apparatus for fixedly orienting a member arranged to carry a magnetic head with respect to a reference plane with three degrees of adjustment, including a base member, three bores defined in said member, a screw extending through each of said bores and threadably received in means in said base member, each of said bores extending from an upper dished recess in said member and further extending from a small diameter to a larger diameter, spring means disposed about said screws in said larger diameter portion of said bores and biasing said member from said base member, said screws having heads with undersides defined partially on a sphere so that said heads engage said member in respective recesses in at least full circle line contact regardless of the orientation of said member to said base member, and a screw threadably extending through said member into contact with said base member, two of said bores being aligned with a reference line of said member and the third bore being offset with respect to said reference line and between said two bores.

2. The apparatus of claim 1 wherein the third bore is midway between said two bores.

3. The apparatus of claim 1 wherein said recesses are conical.

4. The apparatus of claim 1 wherein said recesses are defined on a portion of a sphere.

* * * * *